(12) United States Patent
Shen et al.

(10) Patent No.: US 10,148,690 B2
(45) Date of Patent: Dec. 4, 2018

(54) ACCURATE REAL-TIME IDENTIFICATION OF MALICIOUS BGP HIJACKS

(71) Applicant: Symantec Corporation, Mountain View, CA (US)

(72) Inventors: Yun Shen, Bristol (GB); Yufei Han, Axi-en-Provence (FR); Pierre-Antoine Vervier, Rue Vaux (FR)

(73) Assignee: SYMANTEC CORPORATION, Mountain View, CA (US)

( * ) Notice: Subject to any disclaimer, the term of this patent is extended or adjusted under 35 U.S.C. 154(b) by 281 days.

(21) Appl. No.: 14/977,261

(22) Filed: Dec. 21, 2015

(65) Prior Publication Data

US 2017/0180418 A1    Jun. 22, 2017

(51) Int. Cl.
*H04L 29/06* (2006.01)

(52) U.S. Cl.
CPC ...... *H04L 63/1466* (2013.01); *H04L 63/1408* (2013.01); *H04L 63/1416* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 7,823,202 B1 | 10/2010 | Antonio et al. | |
| 2005/0135369 A1* | 6/2005 | Galand | H04L 45/04 370/392 |
| 2010/0153537 A1* | 6/2010 | Wang | H04L 63/14 709/224 |

OTHER PUBLICATIONS

Author: Jian Chang et al., "AS-CRED: Reputation and Alert Service for Interdomain Routing 11"; Publisher: IEEE Systems Journal; Publication No. XP011518745, ISSN: 1932-8184; Date: Sep. 2013; pp. 396-409 (Year: 2013).*
Konte, et al.; "ASwatch: An AS reputation system to expose bulletproof hosting ASes", Special Interest Group on Data Communication, ACM, Aug. 17, 2015, pp. 625-638.
Chang, et al.; "AS-CRED: Reputation and Alert Service for Interdomain Routing", IEEE Systems Journal, IEEE, vol. 7, No. 3, Sep. 2013, pp. 396-409.
International Search Report and the Written Opinion of the International Searching Authority, PCT/US2016/054154, dated Nov. 24, 2016.

(Continued)

*Primary Examiner* — Eleni A Shiferaw
*Assistant Examiner* — Andrew J Steinle
(74) *Attorney, Agent, or Firm* — Maschoff Brennan

(57) ABSTRACT

A system and method for detecting malicious hijack events in real-time is provided. The method may include receiving routing data associated with a Border Gateway Protocol (BGP) event from at least one BGP router. The method may further include generating a hijack detection model using a machine learning technique, such as Positive Unlabeled learning. The machine learning technique may include at least one data input and a probability output; wherein, the data input couples to receive a set of historically confirmed BGP hijacking data and the routing data, while the probability output transmits a probability value for the malicious event which may be calculated based upon the data input. Finally, the method may include classifying the BGP event as a malicious event or a benign event using the BGP hijack model and correcting routing tables that have been corrupted by a malicious event.

19 Claims, 5 Drawing Sheets

(56) References Cited

OTHER PUBLICATIONS

United States Patent and Trademark Office; International Preliminary Report on Patentability; issued in PCT Application No. PCT/US2016/054154; dated Jun. 26, 2018; 8 pages.
Chang et al; "AS-CRED: Reputation and Alert Service for Interdomain Routing"; IEEE Systems Journal, IEEE, US, vol. 7, No. 3, Sep. 1, 2013; 14 pages.
Konte et al; "ASwatch: An AS Reputation System to Expose Bulletproof Hosting ASes"; presented at SIGCOMM; Aug. 17, 2015; 14 pages.

* cited by examiner

ACCURATE REAL-TIME IDENTIFICATION OF MALICIOUS BGP HIJACKS

BACKGROUND

Cybercriminals, through Border Gateway Protocol (BGP) hijacking, may temporarily steal blocks of Internet Protocol addresses (IP addresses) associated with trusted Autonomous Systems (AS) to perform other malicious activities, such as, spamming, phishing, malware hosting and the like. Since the IP address is a numerical label assigned to each device (e.g., computer, printer) participating in a computer network that uses the Internet Protocol for communication, the thief of the IP address represents a form of identity thief, whereby the tracks of the criminal cannot be retraced. These individual IP addresses may be grouped together into prefixes, which may be originated or owned by an AS (such as Sprint, Verizon, AT&T, and the like). Each AS may include one or more routers having routing tables that are maintained using the BGP as a standard routing protocol for exchanging information about IP routing between ASes. Accordingly, launching attacks from hijacked networks, cybercriminals can hinder traceability and circumvent security systems based on prior IP reputation, which may typically be used as a first layer of defense for networks.

Although BGP hijack monitors facilitate the detection of hijacked network IP prefixes, existing hijack detection technologies suffer in four major areas. First, traditional hijacking detection systems assume a labeled set containing examples of both positive and negative samples, where a positive sample represents a malicious BGP announcement (routing data) and a negative sample represents a benign one. Yet, positive samples for real-world implementations can only be detected by security experts who can confidently identify a BGP hijacking event, while negative samples (benign BGP announcements) are too diverse to be labelled. Further current hijack monitors suffer from many false positives due to the challenging task of invalidating detected hijacks.

Secondly, some current hijack monitors are instrumental in merely helping network operators to monitor their own networks in which case the network operator manually provides the validation or invalidation of detected hijacking events. Third, some of these detection mechanisms only look for anomalies in the Internet routing infrastructure to detect hijacks of network IP prefixes without correlating them with any kind of malicious network traffic to see if the hijacked prefixes might be used to launch other types of attacks. Fourth, some systems only consider a few scenarios of network IP prefix hijacking, which may not necessarily be the ones used by cybercriminals.

Finally, a lot of effort has been made to implement security mechanisms into the routing infrastructure, usually using cryptography, to prevent network IP prefix hijacking attacks (e.g., RPKI, BGPsec, etc.). However, these proposed solutions usually require major changes to the software and hardware of the network devices, which currently prevent these solutions from being widely deployed. It is within this context that the embodiments arise.

SUMMARY

In some embodiments, a system and method of detecting router hijacking events is provided. The method may include receiving, by a data collection module, routing data associated with a BGP event from at least one BGP router. The method may further include processing, by a data processor, the routing data to generate a list of features associated with an origin, a prefix, and/or upstream equipment. Further, the method may include generating a hijack detection model using the routing data and the list of features. The model generating step may include calculating a probability for a malicious event by employing a machine learning technique, such as Positive Unlabeled (PU) learning, which includes at least one data input and a probability output; wherein, the data input couples to receive a set of historically confirmed BGP hijacking data and the routing data, while the probability output transmits a probability value for the malicious event based upon the data input. Moreover, the method may include classifying the BGP event as a malicious event or a benign event using the BGP hijack model. The classifying may comprise evaluating whether the probability is greater than a threshold cut-off value using a holdout data subset of the routing data; whereby, upon verifying that the probability is greater, the event is classified as malicious.

In some embodiments, a router hijack detection system is provided. The router hijack detection system may include a data collection module coupled to receive routing data associated with a BGP event from at least one BGP router, a memory and a processor. The processor may include a data processing module coupled to the data collection module to generate a list of features associated with the routing data. The processor may further include a model generating module coupled to data collection module and the data processing module to generate a hijack detection model based upon the routing data and the list of features. Further, the processor may include a detection unit coupled to the model generating model to classify the BGP event as a malicious event or a benign event using the BGP hijack model the hijack detection model. Moreover the processor may include a verification unit coupled to the detection unit to receive notice of the classified malicious event or benign event and to detect whether a false positive or a false negative has occurred. This verification unit may be coupled to a correction unit for correcting the set of historically confirmed BGP hijacking data. Additionally, a tuning unit coupled to the model generating module for retraining the hijack detection model using the corrected set of historically confirmed BGP hijacking data.

In some embodiments, a tangible, non-transitory, computer-readable media having instructions whereupon which, when executed by a processor, cause the processor to perform the router hijacking detection method described herein. The method may include receiving, by a data collection module, routing data associated with a BGP event from at least one BGP router. The method may further include processing, by a data processor, the routing data to generate a list of features associated with an origin, a prefix, or upstream equipment. Further, the method may include generating a hijack detection model using the routing data and the list of features. The model generating step may include calculating a probability for a malicious event by employing a machine learning technique, such as PU learning, which includes at least one data input and a probability output; wherein, the data input couples to receive a set of historically confirmed BGP hijacking data and the routing data, while the probability output transmits a probability value for the malicious event based upon the data input. Moreover, the method may include classifying the BGP event as a malicious event or a benign event using the BGP hijack model. The classifying may comprise evaluating whether the probability is greater than a threshold cut-off value using a holdout data subset of the routing data;

whereby, upon verifying that the probability is greater, the event is classified as malicious.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

Figure 1A:
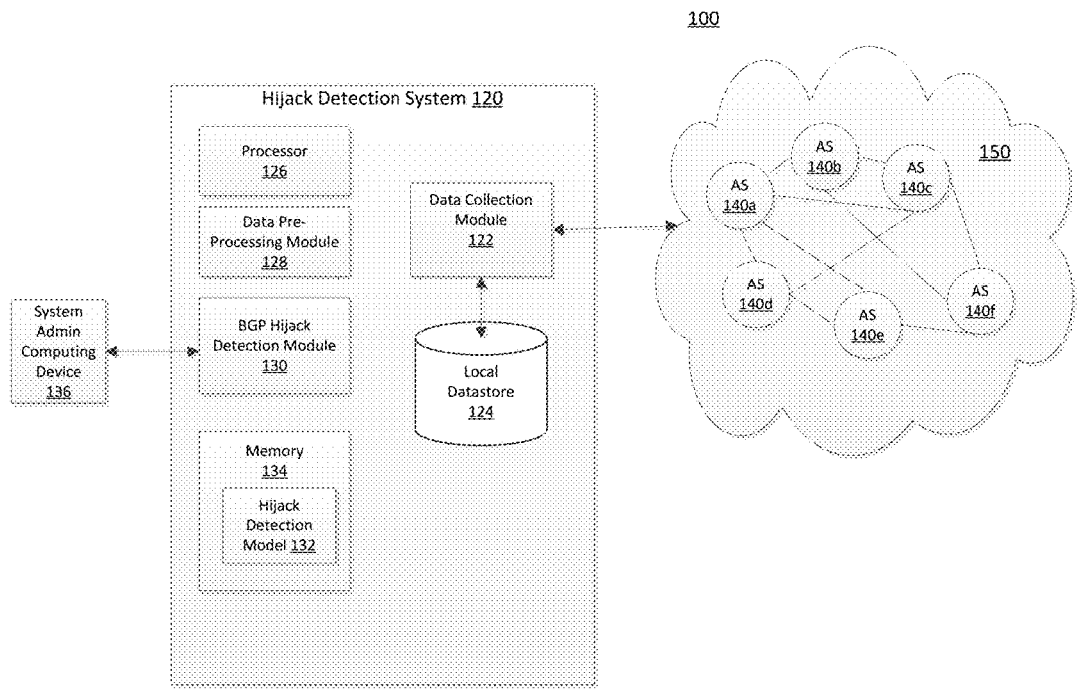
FIG. 1A is a block diagram of an exemplary network architecture having the Hijack Detection System that detects malicious hijack events in real-time applications disclosed herein.

The embodiments below describe a system and method of detecting router hijacking events for ensuring network integrity. The method may include receiving, by a data collection module, routing data associated with a BGP event from at least one BGP router. The method may further include processing, by a data processor, the routing data to generate a list of features associated with an origin, a prefix, and/or upstream equipment. Further, the method may include generating a hijack detection model using the routing data and the list of features. The model generating step may employ the use of a machine learning technique, which includes at least one data input and a probability output; wherein, the data input couples to receive a set of historically confirmed BGP hijacking data and the routing data, while the probability output transmits a probability value for the malicious event which may be calculated based upon the data input. Moreover, the method may include classifying the BGP event as a malicious event or a benign event using the BGP hijack model. In particular, the classifying may comprise evaluating whether the probability is greater than a threshold cut-off value using a holdout data subset of the routing data; whereby, upon verifying that the probability is greater, the event is classified as malicious. Accordingly, knowledge of a network IP prefix associated with a malicious event may be valuable enables the system described herein to take appropriate actions deemed necessary to re-route traffic for not only single IP addresses but also for a whole block of IP addresses (IP prefix).

The system may employ machine learning techniques, such as the PU learning methodology to achieve accurate real time BGP hijack identification, overcoming limited benign training data and relieving manual labelling efforts from security experts. In particular, the model generating step may employ the use of a PU learning technique, having a positive data input, a unlabeled data input, and a probability output, wherein the positive data input is coupled to receive the set of historically confirmed BGP hijacking data and the unlabeled data input is coupled to receive the routing data; while the probability output transmits a probability value for the malicious event which may be calculated based upon the data input. For example, by using 3,899 BGP hijacking data collected in the past 2.5 years together with 340,000 unconfirmed data, the system is able to achieve 99.6% detection rate for all new BGP hijacking events.

The system described herein not only looks for anomalies in the Internet routing infrastructure to detect hijacks of network IP prefixes, but also the system and method described herein may correlate these anomalies with various kinds of malicious network traffic to see if the hijacked prefixes might be used to launch other types of attacks. Detecting malicious use of hijacked networks may help to identify more efficiently malicious activities (e.g., spam, scam web sites) performed by attackers whose goal, by hijacking networks, is to hinder traceability and circumvent IP reputation-based defense systems.

The knowledge of malicious events generated by the system described herein may be used to update existing IP reputation-based systems, such as, for example the updating of IP blacklists used in spam filters. The accurate detection of malicious BGP hijacks will enable identification of networks under full control of cybercriminals, where appropriate actions can be taken (e.g., assign a very low reputation in its security systems) for all network traffic originating from these network IP prefixes in a given period of time. Security systems (e.g., spam filters) usually use IP reputation as a first layer of defense (e.g., to block or deprioritize traffic) as it is a very low resource consuming process compared to other network traffic analyses. The system and method described herein will thus help update existing IP reputation-based systems (e.g., IP blacklists) and result in competitors being forced to use conventional, higher resource demanding, techniques (e.g., download and analysis of emails) for detecting malicious activities originating from hijacked networks. Thereby, the system and method described herein ideally identifies BGP hijacking events automatically and effectively.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

FIG. 1A is a block diagram of an exemplary network architecture 100 that detects malicious events in real-time having, in which embodiments of the Hijack Detection System 120 may operate. The network architecture 100 may include more than one Hijack Detection System 120 coupled to a network 150 (e.g., public network such as the Internet or private network such as a Local Area Network (LAN)). Further, the network architecture 100 may include computing device 136 coupled to receive input from a security expert that verifies false positive and false negative samples during a retraining phase. Examples of a computing device 136 may include, but are not limited to, personal computers, laptops, PDAs, mobile phones, network appliances, etc. The computing device 136 and the Hijack Detection System 120 may reside on the same LAN, or on different LANs that may be coupled together through the Internet, but separated by firewalls, routers, and/or other network devices. In another embodiment, the computing systems may reside on different networks. Although not shown, in various embodiments, the computing systems may be notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

The network 150 may include one or more subnet networks that are under control of an independently administered domain constitute an AS (140a-140f), which is identified by a unique numerical identifier (AS ID) assigned to it by its regional Internet registry. Each AS (140a-140f) may include one or more BGP routers (not shown) to facilitate inter-domain routing, e.g., routing of IP traffic through neighboring autonomous systems (ASes). The AS ID may be associated with one or more IP destination prefixes that the AS owns. Examples of a Hijack Detection System 120 may include, but are not limited to, personal computers, laptops, PDAs, mobile phones, network appliances, etc. The Hijack Detection System 120 may also be a network appliance, a gateway, a personal computer, etc. In one embodiment as shown, the Hijack Detection System 120 one may reside external to the network 150. In another embodiment, the Hijack Detection System 120 one may reside with one AS (140a-140f), which will be described further with reference to FIG. 2.

Each AS (140a-140f) may be coupled together through the Internet, but separated by firewalls, routers, and/or other network devices. The Internet may include tens of thousands of ASes, where each AS may establish neighboring relationships, using BGP routers to maintain and exchange inter-domain routing information (or routing announcements). Although not shown, in various embodiments, the Hijack Detection System 120 may be notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

The Hijack Detection System 120 may include a data collection module 122 for collecting routing data in real-time to be analyzed for malicious BGP events. The may also Hijack Detection System 120 include a local data store 124, which can be one or more centralized data repositories that store current routing data, at least one set of historically confirmed BGP hijacking data (positive samples), negative samples, and the like. The local data store 124 may represent a single or multiple data structures (databases, repositories, files, etc.) residing on one or more mass storage devices, such as magnetic or optical storage based disks, tapes or hard drives. Although illustrated as being local to the Hijack Detection System 120, the local data store 124 may be remote from the Hijack Detection System 120 and the Hijack Detection System 120 can communicate with the local data store 124 over a public or private network.

The Hijack Detection System 120 may further include a processor 126, a data pre-processing module 128, a BGP Hijack Detection Module 130 and memory 134. The data pre-processing module 128 may couple to receive the routing data from the data collection module. The data pre-processing module 128 may include instructions for processing the routing data to generate a list of features associated with its origin, a prefix, and/or any upstream equipment. Such a list may include any one of the features in TABLE 1, below. It should be appreciated that the embodiments have access to historical records of the global BGP announcements. Should a new announcement be detected, the embodiments are able to generate features as shown in Table 1.

TABLE 1

List of Features

1. "prefix is 'valid'",
2. "origin is 'valid'",

TABLE 1-continued

List of Features

3. "upstream is 'valid'",
4. '(prefix,origin) is new',
5. '(prefix,upstream) is new',
6. 'sim(prefix owner,origin owner)',
7. 'sim(prefix owner,upstream owner)',
8. 'sim(origin owner,upstream owner)',
9. 'eq(prefix country code,origin country code)',
10. 'eq(prefix country code,upstream country code)',
11. 'eq(origin country code,upstream country code)',
12. 'eq(prefix registrar,origin registrar)',
13. 'eq(prefix registrar,upstream registrar)',
14. 'eq(origin registrar,upstream registrar)',
15. 'origin in upstream imports',
16. 'origin in upstream exports',
17. 'upstream in origin imports',
18. 'upstream in origin exports',
19. 'origin: prefix count',
20. 'origin: upstream count',
21. 'origin: distinct date count of origin',
22. "origin: distinct date < '1 day' / distinct date ratio",
23. "origin: distinct date < '5 days' / distinct date ratio",
24. "origin: distinct date < '10 days' / distinct date ratio",
25. "origin: distinct date >= '10 days' / distinct date ratio",
26. 'origin: average announcement duration',
27. 'upstream: prefix count',
28. 'upstream: origin count',
29. 'upstream: distinct date count of origin',
30. "upstream: distinct date < '1 day' / distinct date ratio",
31. "upstream: distinct date < '5 days' / distinct date ratio",
32. "upstream: distinct date < '10 days' / distinct date ratio",
33. "upstream: distinct date >= '10 days' / distinct date ratio",
34. 'upstream: average announcement duration'

The BGP Hijack Detection Module 130 may employ the use of a machine learning technique to generate a Hijack Detection Model 132, which includes at least one data input and a probability output. The data input may couple to receive a set of historically confirmed BGP hijacking data from the local datastore 124. Further the data input may couple to receive the routing data from the data collection module 122. The BGP Hijack Detection Module 130 may employ further processing of a probability value for the malicious event generated by the Hijack Detection Model 132 and transmitted through the probability output.

The system may comprise in three phases of operation: a model building phase, malicious BGP hijack detection phase, and model retraining phase. During the model building phase, the BGP Hijack Detection Module 130 may retrieve a set of historically confirmed BGP hijacking data. The BGP Hijack Detection Module 130 may also generate a threshold cut-off value using a holdout data subset of the routing data, wherein the threshold cut-off value is used to make a determination of whether the event is malicious or benign. The BGP Hijack Detection Module 130 may calculate a probability for the malicious event by employing a machine learning technique, having a data input and a probability output, wherein the data input couples to receive the set of historically confirmed BGP hijacking data and the routing data. Finally, the Hijack Detection Model 132 is configured to classify a BGP event as malicious when the probability is greater than the threshold cut-off value.

During the malicious BGP hijack detection phase, although inter-domain routing between ASes makes an AS incapable of preventing a BGP router of a malicious AS (e.g., prefix hijacker) from announcing a route to a destination prefix using a fabricated AS path (e.g., false announcement), the Hijack Detection System 120 may monitor all routing data sent by a BGP router during a pre-determined period to detect a malicious event using the model generated during the model building phase. Although a false announcement may cascade quickly to a large number of BGP routers across multiple ASes and pollute their associated routing tables, the system described herein detects these malicious events in real-time and may issue notice to each AS to independently correct associated routing tables. In another embodiment, the Hijack Detection System 120 may detect a block of IP addresses associated with the malicious event and identify at least one corrupted path. The Hijack Detection System 120 may further generate a corrected path and update the routing table.

During the model retraining phase, the BGP Hijack Detection Module 130 may perform additional testing to detect whether each event is a false negative or a false positive. In another embodiment, the BGP Hijack Detection Module 130 may couple to receive input from an administrator that has verified any false negative or false positive events. The BGP Hijack Detection Module 130 may further correct, in response to a detected false negative or a false positive, the set of historically confirmed BGP hijacking data stored in local datastore 124. The BGP Hijack Detection Module 130 may further generate notice to each AS to correct associated routing tables. Further, the BGP Hijack Detection Module 130 may retrain the BGP hijack model 132 using the corrected set of historically confirmed BGP hijacking data.

Figure 1B:
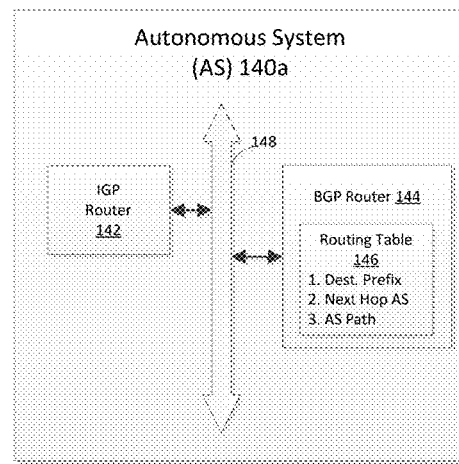
FIG. 1B is an example Autonomous System (AS) of FIG. 1 in some embodiments.

FIG. 1B illustrates an example Autonomous System (AS) 140a of FIG. 1 in some embodiments. AS 140a includes at least one intra-domain network 148 that interconnects at least one BGP router 144 and at least one interior gateway protocol (IGP) router 142. The at least one BGP router 144 is configured to maintain and exchange inter-domain routing information with BGP routers of the neighboring ASes (140b-140e) to facilitate routing of IP traffic to and from the neighboring ASes, as illustrated in FIG. 1, for example. The BGP router 144 may include a routing table 146 that maintains: (1) a destination prefix; (2) a next hop AS; and (3) an AS-level path.

Figure 2:
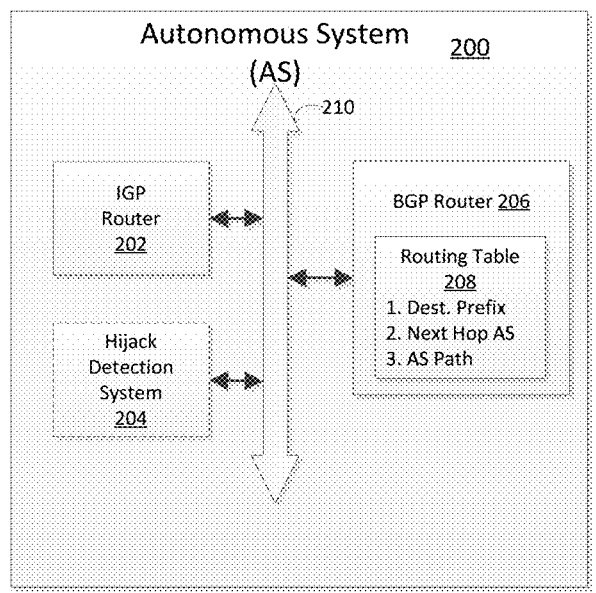
FIG. 2 is an example AS having an embedded Hijack Detection Module.

FIG. 2 illustrates an example AS having an embedded Hijack Detection system in accordance with some embodiments. Similar to AS 140a, AS 200 may include at least one intra-domain network 210 that interconnects at least one BGP router 206 and at least one IGP router 202. The at least one BGP router 206 may be configured to maintain and exchange inter-domain routing information with BGP routers of the neighboring ASes to facilitate routing of IP traffic to and from the neighboring ASes, as illustrated in FIG. 1, for example. The BGP router 206 may include a routing table 146 that maintains: (1) a destination prefix; (2) a next hop AS; and (3) an AS-level path.

The Hijack Detection system 204 may couple to the at least one intra-domain network 210 that interconnects at least one BGP router 206 and at least one IGP router 202. Similar to the stand-alone Hijack Detection system 120, Hijack detection system 204 may comprise a data collection module, a processor, a data pre-processing module, a BGP Hijack Detection Module and memory (not shown). The data collection module may couple to receive the routing data from the at least one intra-domain network 210 that interconnects at least one BGP router 206 and at least one IGP router 202. The data pre-processing module may include instructions for processing the routing data to generate a list of features associated with its origin, a prefix, and/or any upstream equipment. The Hijack Detection system 204 may employ the use of a machine learning technique to generate a Hijack Detection Model, which includes at least one data input and a probability output. The data input of the model may couple to receive a set of historically confirmed BGP hijacking data from a local or remote datastore. Further, the data input of the generated hijack model may couple to receive the routing data. The Hijack Detection system 204 may employ further processing of a probability value for detection of a malicious event.

Figure 3A:
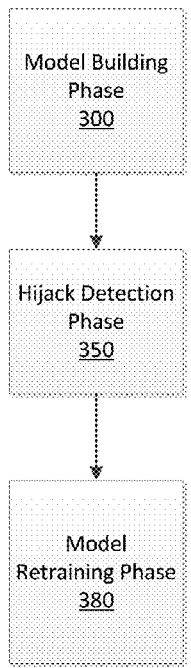
FIG. 3A is a flow diagram of a method for detecting malicious hijacking events in real-time in accordance with some embodiments.

FIG. 3A illustrates a flow diagram of a method for detecting malicious hijacking events in real-time in accordance with some embodiments. As noted supra, the system and method described herein for hijack detection may comprise three phases of operation: a model building phase 300, malicious BGP hijack detection phase 350, and model retraining phase 380. For example, during the first phase in an action 300, the hijack detection system 120 may build a hijack detection model based upon a machine learning technique. Suitable machine learning methods for practicing hijack detection can include, for example, supervised learning methods (e.g., analytical learning, artificial neural networks, case-based reasoning, decision tree learning, inductive logic programming Gaussian process regression, gene expression programming, kernel estimators, support vector machines, random forests, ensembles of classifiers, etc.), unsupervised learning methods (e.g., neural networks with the self-organizing map (SOM) and adaptive resonance theory (ART)), semi-supervised learning method (e.g., constrained clustering, PU learning), reinforced learning methods (e.g., Monte Carlo methods), transductive inference methods (e.g., transductive support vector machines, Bayesian Committee machines), or multi-task learning methods (e.g., clustered multi-task learning).

During the second phase in an action 350, the hijack detection system 120 may process through real-time hijack detection of routing data sent in the form of BGP announcements. For example, routing data may be monitored in real-time by the data collection module 122 and BGP Hijack Detection Module 130. The BGP Hijack Detection Module 130 may use the hijack detection model 132 generated in action 300 to identify malicious and benign events. The BGP Hijack Detection Module 130 may further detect blocks of IP addresses associated with at least one malicious event. Further, the BGP Hijack Detection Module 130 may detect at least one corrupt path associated with the identified malicious event. Accordingly, the BGP Hijack Detection Module 130 may generate a corrected path to be stored in the routing table of the BGP router, replacing the at least one corrupted path.

During the third phase in an action 380, false negative and false positive data may be verified in an effort to retrain the hijack detection model generated during the model building phase. For example, the BGP Hijack Detection Module 130 may identify a false negative and false positive dataset and verify the accuracy thereof. In another embodiment, the BGP Hijack Detection Module 130 may coupled to receive input from computing device 136, where a security expert enters verified data relating the false negative and false positive dataset. These three phases will be explained in further detail with reference to FIGS. 3B and 3C.

Figure 3B:
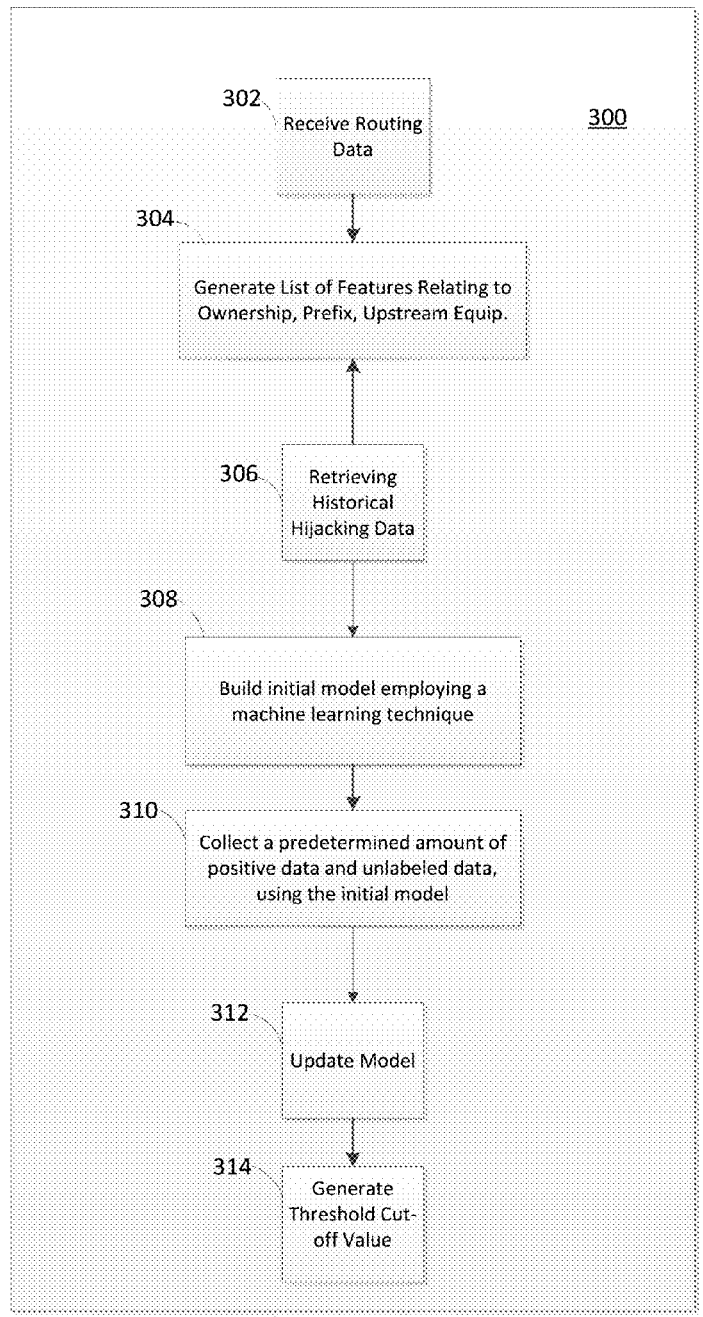
FIG. 3B is a flow diagram of the model building phase 300 of FIG. 3A in accordance with some embodiments.

FIG. 3B illustrates a flow diagram of the model building phase 300 of FIG. 3A in accordance with some embodiments. During the model building phase 300, the data collection module may gather BGP routing data in real-time in an action 302. For example, data collection module 122 may couple to receive BGP announcements sent by BGP routers of ASes (140a-140f). In an action 304, a list of features relating ownership, prefix data, and upstream equipment may be generated from the routing data. For example, the data pre-processing module 128 may process each BGP routing announcement to generate a list of features relating to ownership, prefix, and/or upstream equipment representing this announcement. In an action 306, the hijack detection may retrieve historically confirmed hijacking data. For example, BGP hijack detection module 130 may retrieve historically confirmed hijacking data from a local datastore such as database 124. In another embodiment, historically confirmed hijacking data may be gathered by data collection module 122 from some networked storage unit through network 150.

In an action 308, an initial model may be built using historically confirmed BGP hijacking data retrieved in an action 306 along with the list of features of an action 304. For example, the BGP hijack detection module 130 may employ a machine learning algorithm to generate the initial model using some of the real-time routing data. Further, in an action 310, a predetermined amount of positive data and unlabeled data may be collected using the initial model. For example, once the hijack detection system 120 gathers a predetermined amount of positive data (i.e. confirmed BGP hijacks) and unlabeled data (i.e. the data gathered by data collection module), the BGP Hijack Detection Module 130 may employ the use of a PU learning method to build the hijack detection model, updating the model at an action 312.

Accordingly, in an action 314, a threshold cut-off value may be generated. For example, the BGP Hijack Detection Module 130 may generate a threshold using a holdout data subset of the routing data. In some embodiments a receiver operating characteristic (ROC) curve may be used to generate the threshold. For example, a false positive rate expectation may be preset at 0.1%, where the BGP Hijack Detection Module 130 may look to the ROC curve to make a determination of what threshold cut-off value corresponds to the 0.1% false positive rate. Due to the probabilistic nature of PU learning, this threshold may be used as a cut-off value in determining whether a BGP announcement is malicious. In particular, an announcement with a probability larger than the threshold may be classified as malicious. Once the hijack detection model is built, the model may reside in the memory 134 for hijack detection purposes.

Machine learning techniques using positive and unlabeled examples (PU learning) arise as a solution in binary classification applications, where it is difficult to collect negative data samples or where large amount of false negatives exist in the training data. For example, with reference to the system and method described herein, the routing data may be comprised of two sets of samples upon which the hijack detection model may be built: a positive set including BGP hijacking examples that are manually confirmed and verified; and a mixed set, which contains suspicious events that can be either BGP hijacking or benign BGP announcement. The mixed set, however, is initially unlabeled. That is, there is no distinction between a malicious hijacking event and a benign BGP announcement in the mixed set of data. The lack of negative (benign BGP announcement) samples represents the current real-world manual BGP hijacking identification process, since most rely upon a security expert to confidently identify a BGP hijacking event (positive sample), while other BGP announcements (negative samples) are too diverse to be labelled. Additionally, certain suspicious events may not be labeled due to complicated factors associated with these announcements that block further inspections.

Regarding hijack detection, the lack of reliable negative samples is a common issue in cyber threat identification. For example, there are no current systems that address in network intrusion and virus detection. Labelling network connections as benign or intrusive ones requires enormous overheads for human experts. Furthermore, any change of network traffic can change the profiles of benign behaviors. If identified intrusive connections are considered positive samples and benign connections are considered negative samples, one can see that true negative samples are more difficult to obtain than positive training data. Current detection strategies that are distance or density based have been applied to learn from only explicitly labelled intrusion threats. However, these methods assume either malicious or benign behaviors have relatively constant profiles, which is not always satisfied in real life data.

Figure 3C:
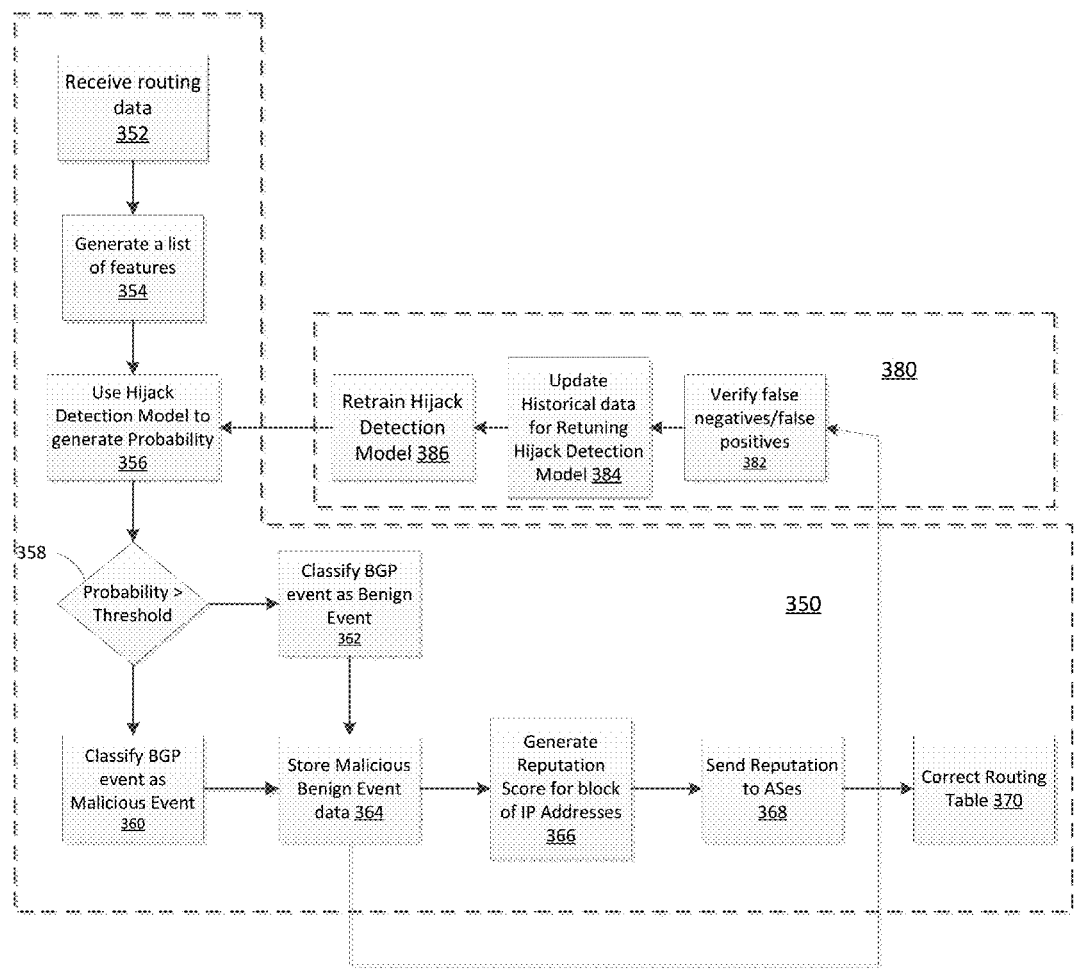
FIG. 3C is a flow diagram of the hijack detection phase 350 and the model retraining phase 380 of FIG. 3A in accordance with some embodiments.

FIG. 3C illustrates a flow diagram of the Hijack Detection phase 350 and the Model Retraining Phase 380 of FIG. 3A in accordance with some embodiments. During the malicious BGP hijack detection phase in an action 352 the hijack detection system may receive routing data. For example, the data collection module 122 may gather BGP routing information in real-time. In an action 354, a list of features relating ownership, prefix data, and upstream equipment may be generated from the routing data received in action 352. For example, each BGP routing announcement may be processed by the data pre-processing module to generate a list of features to representing the received BGP announcement(s). In an action 356, the hijack detection model may be used to generate a probability of a malicious event. For example, the BGP Hijack Detection Module 130 may process each announcement using the hijack detection model 132 stored in memory 134. At decision block 358, the probability is compared with the threshold value of the hijack detection model. For example, the probability generated by the hijack detection model 132 may be evaluated to determine whether it is greater than the threshold, where the event is classified as either malicious (in action 360) or benign (in action 362), based on the threshold identified in the model building phase 300.

In an action 364, the malicious and benign events may be stored. For example, the malicious and benign events may be stored in the local datastore 124, representing one or more centralized data repositories. In another embodiment the identified events may be in a storage device separate from the hijack detection system 120 or stored remotely over a public or private network. As explained in more detail with reference to the retraining phase 380 below, this stored data may be used as input for retraining the model. In an action 366, a reputation score for an associated block of IP addresses may be generated. For example, the BGP hijack detection module 130 may generate a reputation score using the identified malicious and benign events associated with the routing data received by the data collection module 122. Accordingly, in an action 368, the reputation score may be sent to the ASes. For example, the hijack detection system 120 may send the reputation score over network 150 to the ASes (140a-140f). Further, in an action 370, the routing table of the BGP router having the identified at least one malicious event may be corrected. For example, the BGP hijack detection module 130 may identify the block of IP addresses associated with each malicious event. The BGP hijack detection module 130 may identify each corrupt path in the routing table that corresponds to each malicious event. In addition, the BGP hijack detection module 130 may generate a corrected path using current knowledge of the routing table and corresponding ASes (140a-140f) to update the routing table.

During the retraining phase 380 in an action 382, the false negatives and false positives may be verified. For example, a process for verification may be run using the BGP Hijack Detection Module 130. In another embodiment, a system administrator (security expert) may manually confirm if a BGP announcement is a malicious hijack event and enter this data through using computing device 136 coupled to the BGP Hijack Detection Module 130. Advantageously, this part of the verification process is not for investigation of each malicious BGP hijacking event. That is, the BGP Hijack Detection Module 130 or the security expert need only to verify whether either false positive or false negative cases in an effort to incrementally improve the quality of the training data. In an action 384, the historically confirmed hijack data may be updated. For example, the verified false negatives that prove to be malicious may be added to the historically confirmed hijack data stored in local datastore 124. Once the data is accumulated to a certain size or to match certain business requirements (e.g. where the false positives increases above certain value), the historical data may be updated; and, in an action 386 the hijack detection model may be retrained with the updated data. Advantageously, in some embodiments, the retraining at action 386 may take less than 10 minutes to complete, since the data has already been processed and transformed into a list of features.

Figure 4:
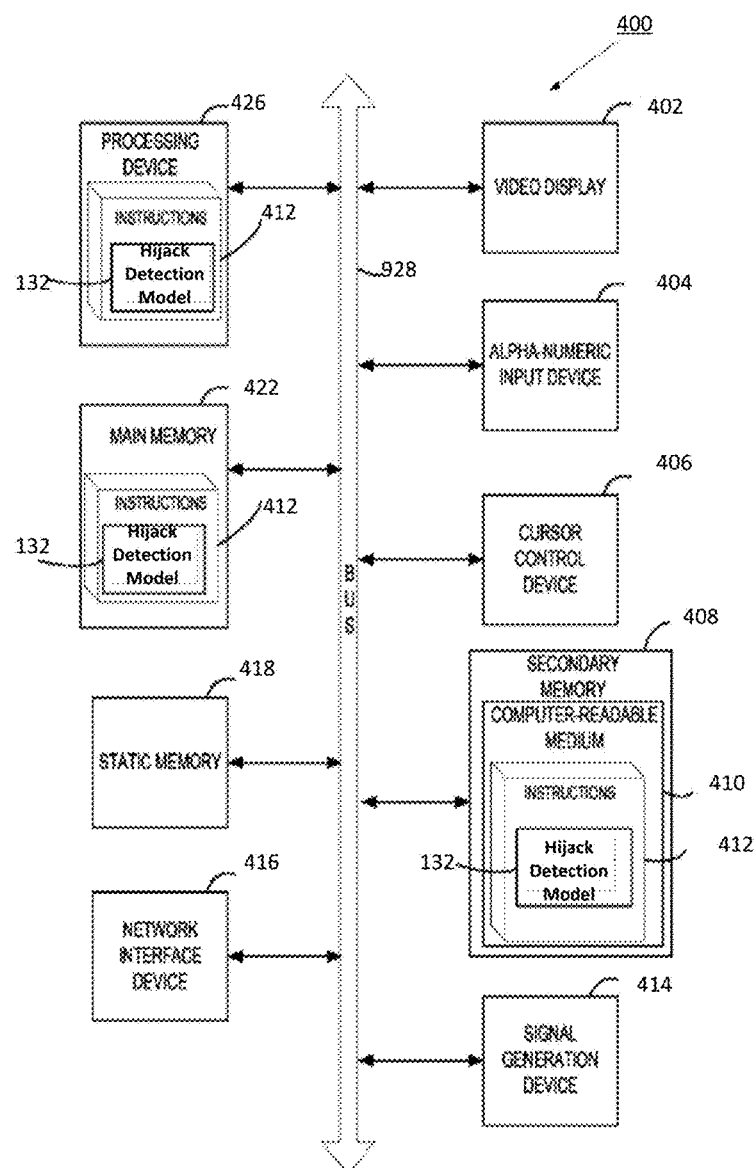
FIG. 4 is an illustration showing an exemplary computing device which may implement the embodiments described herein.

FIG. 4 is a diagram of one embodiment of a computer system for facilitating the execution of the DLP manager. Within the computer system 400 is a set of instructions for causing the machine to perform any one or more of the methodologies discussed herein. CPU 400 can be defined to execute the functionality described herein to enable the functionality described with reference to FIGS. 1-3C. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 426, a main memory 422 (e.g., read-only memory (ROM), flash memory, dynamic random access memory (DRAM) such as synchronous DRAM (SDRAM) or DRAM (RDRAM), etc.), a static memory 418 (e.g., flash memory, static random access memory (SRAM), etc.), and a secondary memory 408 (e.g., a data storage device in the form of a drive unit, which may include fixed or removable computer-readable storage medium), which communicate with each other through a bus 428. The code embodying the functionality of the method disclosed herein may be stored within main memory 422, static memory 418, or secondary memory 408 for execution by a processor such as processing device 426 in some embodiments. The operating system on the computing device may be MS-WINDOWS®, UNIX®, LINUX®, iOS®, CentOS®, Android®, Redhat Linux®, z/OS®, or other known operating systems. It should be appreciated that the embodiments described herein may be integrated with virtualized computing system also.

Processing device 426 represents one or more general-purpose processing devices such as a microprocessor, central processing unit, or the like. More particularly, the processing device 426 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 426 may also be one or more special-purpose processing devices such as an application specific integrated circuit (ASIC), a field programmable gate array (FPGA), a digital signal processor (DSP), network processor, or the like. Processing device 426 is configured to execute the instructions 424 for performing the operations and steps discussed herein.

The computer system 400 may further include a network interface device 416. The computer system 400 also may include a video display unit 402 (e.g., a liquid crystal display (LCD) or a cathode ray tube (CRT)) connected to the computer system through a graphics port and graphics chipset, an alphanumeric input device 404 (e.g., a keyboard), a cursor control device 406 (e.g., a mouse), and a signal generation device 414 (e.g., a speaker).

The secondary memory 408 may include a machine-readable storage medium (or more specifically a computer-readable storage medium) 410 on which is stored one or more sets of instructions 412 embodying any one or more of the methodologies or functions described herein. In one embodiment, the instructions 412 include instructions for the Hijack Detection Model 132. The instructions 412 may also reside, completely or at least partially, within the main memory 422 and/or within the processing device 426 during execution thereof by the computer system 400, the main memory 422 and the processing device 426 also constituting machine-readable storage media.

The computer-readable storage medium 410 may also be used to store the instructions 412 persistently. While the computer-readable storage medium 410 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 412, components and other features described herein can be implemented as discrete hardware components or integrated in the functionality of hardware components such as ASICS, FPGAs, DSPs or similar devices. In addition, the instructions 412 can be implemented as firmware or functional circuitry within hardware devices. Further, the instructions 412 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "I" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:

receiving, by a data collection module, routing data associated with a Border Gateway Protocol (BGP) event from at least one BGP router that is associated with at least one upstream autonomous system (AS), wherein the routing data includes:
a number of times that the at least one upstream AS has been observed announcing new Internet Protocol (IP) prefixes for less than ten days, and
a duration of time that the at least one upstream AS has announced new IP prefixes;

processing, by a data processor, the routing data to generate a list of features associated with an origin, a prefix, or upstream equipment, wherein the list of features includes a ratio between the number of days that the at least one upstream AS has been observed announcing new IP prefixes for less than ten days and the duration of time that the at least one upstream AS has announced new IP prefixes;

receiving, from a database, a set of historically confirmed BGP hijack data;

generating a hijack detection model by employing a positive unlabeled learning (PU learning) algorithm using (i) the routing data, (ii) the list of features, including the ratio between the number of days that the at least one upstream AS has been observed announcing new IP prefixes for less than ten days and the duration of time that the at least one upstream AS has announced new IP prefixes, and (iii) the set of historically confirmed BGP hijack data, wherein generating the hijack detection model does not consider historically confirmed benign BGP data;

classifying the BGP event as a malicious event or a benign event using the hijack detection model;
determining, in response to a malicious event, a block of IP addresses associated with the malicious event;
accessing a routing table to identify at least one corrupted path associated with the malicious event;
generating a corrected path using the routing table; and
updating the routing table with the corrected path.

2. The method of claim 1, wherein the generating the hijack detection model comprises:
generating a threshold cut-off value using a holdout data subset of the routing data; and
calculating a probability for the malicious event;
wherein the BGP event is classified as the malicious event when the probability is greater than the threshold cut-off value.

3. The method of claim 1, wherein the PU learning algorithm includes a positive data input, an unlabeled data input, and a probability output, wherein the positive data input is coupled to receive the set of historically confirmed BGP hijacking data and the unlabeled data input is coupled to receive the routing data.

4. The method of claim 1, wherein the classifying the BGP event comprises:
receiving a probability for a hijacking event from the hijack detection model;
determining whether the probability is greater than a predetermined value; and
classifying, in response to the probability being greater than the predetermined value, the BGP event as the malicious event.

5. The method of claim 1, further comprising:
detecting whether each event is a false negative or a false positive;
correcting, in response to a detected false negative or a false positive, the set of historically confirmed BGP hijacking data; and
retraining the BGP hijack model using the corrected set of historically confirmed BGP hijacking data.

6. The method of claim 1, further comprising:
generating, in response to a malicious event, a reputation score for a block of IP addresses; and
transmitting the reputation score to at least one coupled autonomous system (AS).

7. The method of claim 1, wherein:
the routing data includes a number of times that the at least one upstream AS has been observed announcing new IP prefixes for less than five days, and
the list of features includes the ratio between the number of days that the at least one upstream AS has been observed announcing new IP prefixes for less than five days and the duration of time that the at least one upstream AS has announced new IP prefixes.

8. A router hijack detection system comprising:
a memory; and
a processor coupled to the memory, the processor being configured to:
receive routing data associated with a BGP event from at least one BGP router that is associated with at least one upstream autonomous system (AS), wherein the routing data includes a number of times that the at least one upstream AS has been observed announcing new Internet Protocol (IP) prefixes for less than ten days, and a duration of time that the at least one upstream AS has announced new IP prefixes;
generate a list of features associated with the routing data, wherein the list of features includes a ratio between the number of days that the at least one upstream AS has been observed announcing new IP prefixes for less than ten days and the duration of time that the at least one upstream AS has announced new IP prefixes;
receive a set of historically confirmed BGP hijack data;
generate a hijack detection model by employing a positive unlabeled learning (PU learning) algorithm using (i) the routing data, (ii) the list of features, including the ratio between the number of days that the at least one upstream AS has been observed announcing new IP prefixes for less than ten days and the duration of time that the at least one upstream AS has announced new IP prefixes, and (iii) the set of historically confirmed BGP hijack data, wherein generating the hijack detection model does not consider historically confirmed benign BGP data;
classify the BGP event as a malicious event or a benign event using the BGP hijack model the hijack detection model;
determine, in response to a malicious event, a block of IP addresses associated with the malicious event;
access a routing table to identify at least one corrupted path associated with the malicious event;
generate a corrected path using the routing table; and
update the routing table with the corrected path.

9. The router hijack detection and routing table correction system of claim 8, wherein the processor is further configured to:
generate a threshold cutoff value using a holdout data subset of the routing data; and
calculate a probability for the malicious event, wherein the BGP event is classified as the malicious event when the probability is greater than the threshold cut-off value.

10. The router hijack detection and routing table correction system of claim 8, wherein the PU learning algorithm includes a positive data input, an unlabeled data input, and a probability output, wherein the positive data input is coupled to receive the set of historically confirmed BGP hijacking data and the unlabeled data input is coupled to receive the routing data.

11. The router hijack detection and routing table correction system of claim 8, wherein the processor is further configured to:
receive notice of the classified malicious event or benign event and to detect whether a false positive or a false negative has occurred;
correct the set of historically confirmed BGP hijacking data; and
retrain the hijack detection model using the corrected set of historically confirmed BGP hijacking data.

12. The router hijack detection and routing table correction system of claim 8, wherein the processor is further configured to:
generate a reputation score in response to a malicious event for a block of IP addresses;
transmit the reputation score to at least one coupled autonomous system (AS).

13. The router hijack detection and routing table correction system of claim 8, wherein:
the routing data includes a number of times that the at least one upstream AS has been observed announcing new IP prefixes for less than five days, and
the list of features includes the ratio between the number of days that the at least one upstream AS has been observed announcing new IP prefixes for less than five days and the duration of time that the at least one upstream AS has announced new IP prefixes.

14. A non-transitory computer-readable medium including code for performing a method, the method comprising:
receiving routing data associated with a BGP event from at least one BGP router that is associated with at least one upstream autonomous system (AS), wherein the routing data includes:
a number of times that the at least one upstream AS has been observed announcing new Internet Protocol (IP) prefixes for less than ten days, and
a duration of time that the at least one upstream AS has announced new IP prefixes;
processing the routing data to generate a list of features, wherein the list of features includes a ratio between the number of days that the at least one upstream AS has been observed announcing new IP prefixes for less than ten days and the duration of time that the at least one upstream AS has announced new IP prefixes;
receiving a set of historically confirmed BGP hijack data;
generating a hijack detection model by employing a positive unlabeled learning (PU learning) algorithm using (i) the routing data, (ii) the list of features, including the ratio between the number of days that the at least one upstream AS has been observed announcing new IP prefixes for less than ten days and the duration of time that the at least one upstream AS has announced new IP prefixes, and (iii) the set of historically confirmed BGP hijack data, wherein generating the hijack detection model does not consider historically confirmed benign BGP data;
classifying the BGP event as a malicious event or a benign event using the BGP hijack model;
determining, in response to a malicious event, a block of IP addresses associated with the malicious event;
accessing a routing table to identify at least one corrupted path associated with the malicious event;
generating a corrected path using the routing table; and
updating the routing table with the corrected path.

15. The computer-readable medium of claim 14, wherein the generating the hijack detection model comprises:
generating a threshold cut-off value using a holdout data subset of the routing data; and
calculating a probability for the malicious event;
wherein the BGP event is classified as the malicious event when the probability is greater than the threshold cut-off value.

16. The computer-readable medium of claim 14, wherein the PU learning algorithm includes a positive data input, an unlabeled data input, and a probability output, wherein the positive data input is coupled to receive the set of historically confirmed BGP hijacking data and the unlabeled data input is coupled to receive the routing data.

17. The computer-readable medium of claim 14, wherein the classifying the BGP event comprises:
receiving a probability for a hijacking event from the hijack detection model;
determining whether the probability is greater than a predetermined value; and
classifying, in response to the probability being greater than the predetermined value, the BGP event as the malicious event.

18. The computer-readable medium of claim 14, wherein the method further comprising:
detecting whether each event is a false negative or a false positive;
correcting, in response to a detected false negative or a false positive, the set of historically confirmed BGP hijacking data; and
retraining the BGP hijack model using the corrected set of historically confirmed BGP hijacking data.

19. The computer-readable medium of claim 14, wherein:
the routing data includes a number of times that the at least one upstream AS has been observed announcing new IP prefixes for less than five days, and
the list of features includes the ratio between the number of days that the at least one upstream AS has been observed announcing new IP prefixes for less than five days and the duration of time that the at least one upstream AS has announced new IP prefixes.

\* \* \* \* \*